Aug. 10, 1926.
N. B. HURD
DOORSTOP
Filed Dec. 26, 1925
1,595,098
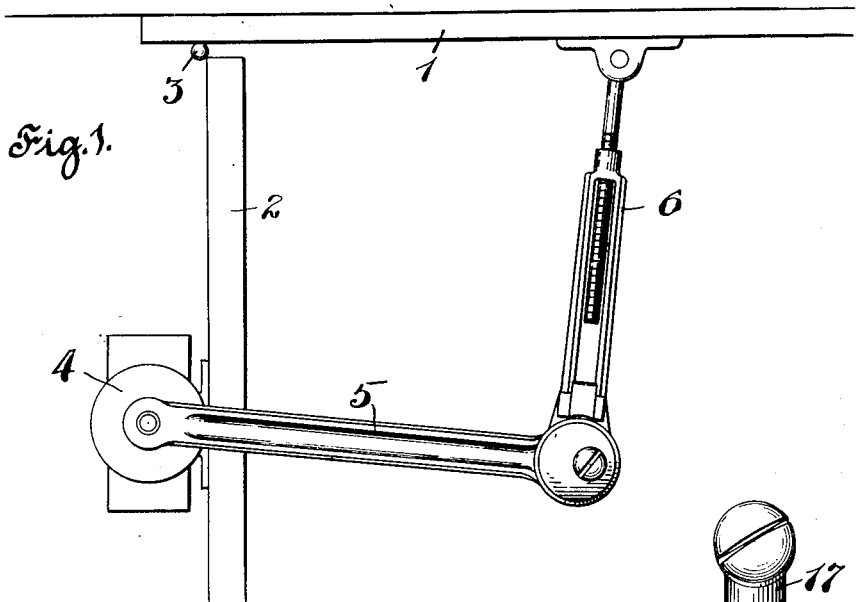
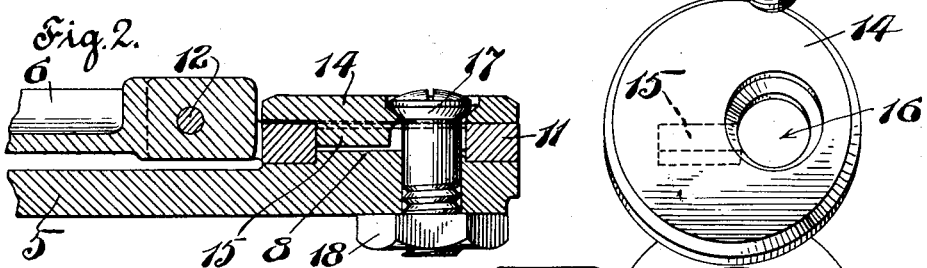
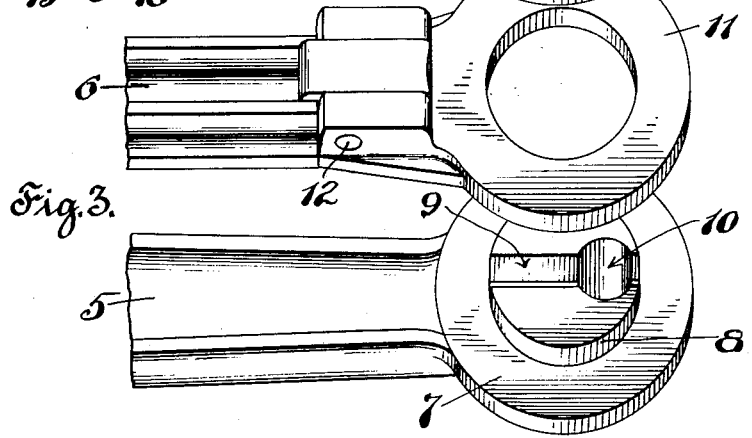
INVENTOR
Norman B. Hurd
BY
ATTORNEYS Patented Aug. 10, 1926.

1,595,098

UNITED STATES PATENT OFFICE.

NORMAN B. HURD, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DOORSTOP.

Application filed December 26, 1925. Serial No. 77,828.

My invention relates to door stops or holders, the object being to provide simple, effective and durable mechanism for holding the door ajar at any desired angle relatively to the door opening, which mechanism is provided with means to permit quick and easy adjustment.

In the accompanying drawings—

Fig. 1 is a plan view showing my invention as in use;

Fig. 2 is a relatively enlarged sectional view of certain parts, the two arms of the holder being swung into position one above the other;

Fig. 3 is a view showing several of the parts in perspective and slightly separated, to facilitate an understanding of the assembly.

1 represents the top of a door casing. 2 represents a door, hinged at 3. 4 represents conventionally a door check and closer of any desired type, the same being secured to the upper part of the door 2. My invention is of particular value when associated with a door closer of this type. 5 represents a lever arm carried and operated by the door closer 4. This arm is connected at its outer end in the manner hereinafter described to a second arm 6, which in turn is connected to the door casing 1. The arm 5 is provided at its outer end with a flat annular bearing head 7, in the center of which is an upstanding hub 8. 9 is a slot extending diametrically across the hub 8, while 10 is a bolt passage extending through the bearing head 7, said bolt passage being located at one side of the center of the hub 8. The arm 6 carries a ring-like bearing head 11, which I may term a cam ring and which, as will be seen by reference to Fig. 2, is tapered so as to be thinner at one side than the other. This bearing 11 rotatably fits on the hub 8, so as to rest on the bearing face of the head 7. The ring 11 is preferably formed separately from the arm 6 and is pivoted thereto at 12, so as to have a slight compensating rocking motion up and down.

14 is a disk-like bearing plate arranged to rest upon the cam ring 11. On the under side of the plate 14 is a lug 15, which fits into the slot 9 in the hub 8. 16 is a bolt passage in the plate 14, registering with the bolt passage 10 in the hub 8. 17 is a bolt provided with a snugly fitting adjusting nut 18.

When these several parts have been assembled, as shown in Fig. 2, the parts 7 and 14 stand at a slight angle relatively to each other, since they both bear upon the tapered cam ring 11. It therefore follows that, if the cam ring 11 is rotated between the parts 7 and 14, it will become jammed after a certain degree of rotary movement. The point where the jamming action occurs depends upon the position of the adjusting nut 18 on the bolt 17. By slacking off the nut a wider range of rotary movement of the cam ring 11 relatively to the parts 7 and 14 may be had, while by tightening up said nut a lesser range of movement may be had before the parts become jammed. It is this jamming of the parts that serves to hold the two arms 5 and 6 (and hence the door) at a predetermined angle.

It should be understood that I have shown and described my invention in only one preferred and successful form, and that I am aware that various changes may be made without departing from the spirit or scope of the invention and the appended claims.

I claim:

1. A door holder mechanism, including two arms pivotally connected to each other at one end and arranged to be connected at their opposite ends to a door and a door casing, said pivotal connection between said arms comprising a bearing head on one of said arms having an annular bearing surface and a central raised hub, the other arm having a bearing head comprising a cam ring mounted to rotate on said hub and having two annular bearing surfaces, a bearing plate above said hub, arranged to coact with the bearing surface on that side of said cam ring, means for holding said bearing plate against rotation relatively to said hub, and adjustable means of connection between said bearing plate and the first-mentioned bearing head to vary the spacing between the two for the purpose described.

2. In a construction such as set forth in claim 1, said adjusting means comprising a bolt passing through said parts at one side of the center of the same.

3. In a construction such as recited in claim 1, said cam ring being pivotally connected to its respective arm for compensating action.

4. In a construction such as recited in claim 1, said adjusting means comprising a bolt passing through said parts at a point within the cam ring.

5. A door holder mechanism including two arms having coacting bearing surfaces at one end, the opposite ends being arranged to be attached to a door and door casing, a bearing plate having a bearing surface coacting with a second bearing surface on one of said arms, said bearing surfaces on one arm being inclined to each other, and adjustable means loosely connecting said plate and arms and limiting the extent of separation of said three connected members, whereby, upon a predetermined relative rotation between said arms, said inclined surfaces on said one arm will wedge on the coacting surfaces on said other arm and plate to limit the extent of relative rotation between said arms.

6. A door holder mechanism including two arms arranged to be connected at one end to a door and door casing respectively, a bearing plate on the outside of one of said arms, a pin member loosely connecting the opposite ends of said arms and said plate, said pin means serving to limit only the separating movement of said three connected members, said connected members having wedging means arranged to jam upon a predetermined relative rotation between said arms.

7. A door holder mechanism, including a pair of arms to be connected at their ends to a door and door casing respectively, a pin extending through the opposite ends of said arms, a plate having an eccentric aperture therein through which said pin extends, said arms and plate having coacting wedging bearing surfaces to limit the extent of rotative movement between said arms, and adjustable means on said pin for varying the permissible extent of separation of said arms and plate longitudinally of said pin.

NORMAN B. HURD.